C. W. RASMUS.
SEAT SECURING DEVICE FOR WAGONS.
APPLICATION FILED MAR. 5, 1909.
947,028.
Patented Jan. 18, 1910.
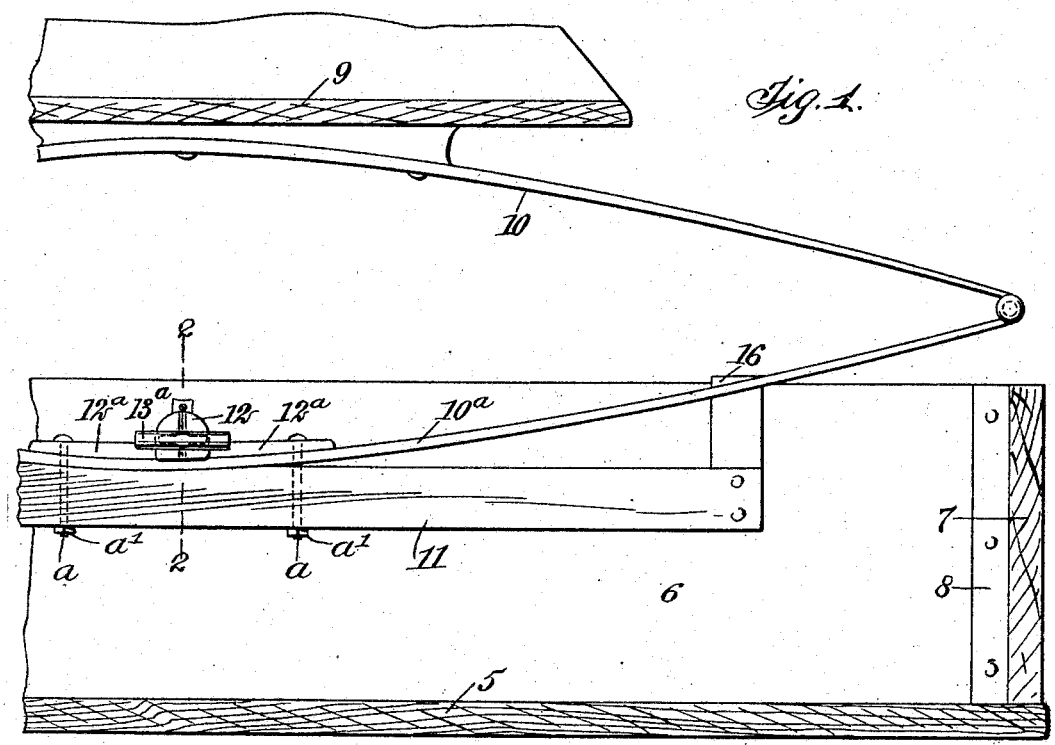
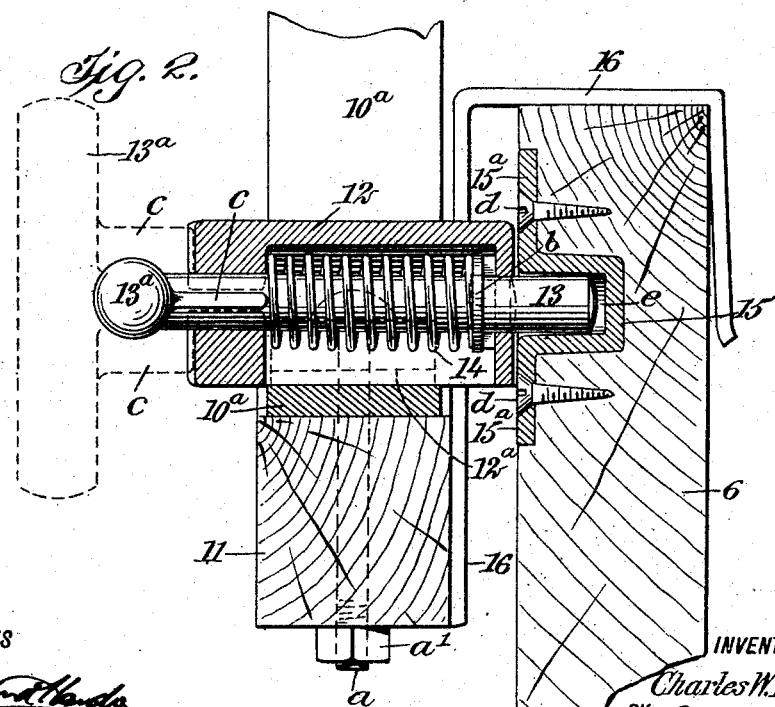
INVENTOR
Charles W. Rasmus
BY
ATTORNEYS

UNITED STATES PATENT OFFICE.

CHARLES W. RASMUS, OF MOUNT UNION, IOWA.

SEAT-SECURING DEVICE FOR WAGONS.

947,028.  Specification of Letters Patent.  Patented Jan. 18, 1910.

Application filed March 5, 1909. Serial No. 481,242.

*To all whom it may concern:*

Be it known that I, CHARLES W. RASMUS, a citizen of the United States, and a resident of Mount Union, in the county of Henry and State of Iowa, have invented a new and Improved Seat-Securing Device for Wagons, of which the following is a full, clear, and exact description.

There is a class of light freight wagons, each provided with an oblong box-like body having parallel sides. Usually such wagons have each a single seat mounted on springs that engage and are supported on the sides of the body, being loosely mounted on the upper edges of said sides. Such wagons are frequently employed in the handling of different kinds of granular material in bulk, and the load is dumped at the rear end of the body. This displaces the seat if it is not secured on the body, and as it is desirable at times to remove the seat and then quickly secure it in position for service, means for such a purpose is the subject of my invention. To this end the improvement provides novel, simple details of construction for a seat securing device, that may be readily connected with the body and seat of a wagon of the character indicated, and afford convenient and reliable means for detachably securing the seat transversely on the wagon body.

The invention consists in the novel construction and combination of parts, as is hereinafter described, and defined in the appended claims.

Reference is to be had to the accompanying drawings forming a part of this specification, in which similar characters of reference indicate corresponding parts in both the views.

Figure 1 is a longitudinal sectional view of a wagon body of the rectangular box type, and a transverse, partly sectional, view of a spring-supported seat secured by the improvement on one side board of the body; and Fig. 2 is an enlarged transverse sectional view of the upper portion of a side board for a wagon body, and an enlarged longitudinal sectional view of the improved seat locking device mounted on the seat and side board, in interlocked condition, the section being taken substantially on the line 2—2 in Fig. 1.

In the drawings, 5 indicates the bottom boards or platform of a rectangular wagon body, 6 the side boards therefor, and 7 the front transverse end gate for the wagon body, said end gate being secured upon an end of the side board by a cleat 8, as usual.

The seat which is to be detachably secured transversely on the upper edges of the side boards of the wagon body, is of ordinary form, having a bottom board 9, that at or near each end thereof, is secured upon the upper half portions of two similar elliptical springs 10, one only appearing in the drawings, these springs being disposed parallel with each other, and when mounted upon the side boards 6 are also parallel therewith. The lower section 10$^a$ of each elliptical spring 10, is seated upon a base strip 11, and is thereto secured by bolts $a$.

On the upper side and at the center of said lower section 10$^a$ of each spring 10, a spring holding casing 12 is mounted, from the opposite sides of which extend two similar leaf plates 12$^a$. Said plates that are seated upon the lower section of the corresponding elliptical spring 10, are thereon secured by the bolts $a$, and nuts $a'$ thereon, said bolts passing down through the leaves 12$^a$, spring section 10$^a$, and respective base strip 11, as appears for one spring 10, and strip 11, in Fig. 2.

The length of the seat board 9 is so proportioned that the outer ends of the spring casings 12 will have clearance from the inner surfaces of the side boards 6 when the seat is placed on said side boards. In each casing 12 a locking bolt 13 is slidably located, by a loose engagement of its cylindrical body within opposite perforations respectively formed in the end walls of said casing, as shown for one casing and locking bolt in Fig. 2.

Upon each bolt 13 a coiled spring 14 is loosely mounted, and at one end presses upon a radial collar $b$, that is formed or secured on the locking bolt, the opposite end of the coiled spring engaging the adjacent end wall of the casing 12, as shown in Fig. 2. The body of each locking bolt 13 may be prevented from turning around, by providing opposite feather keys $c$ that loosely slide in corresponding grooves in the end wall of the casing 12, and on this end of the locking bolt which projects beyond the end of the casing a transverse handle 13$^a$ is formed or secured, affording convenient means for sliding the bolt.

In each side board 6, opposite a corresponding outer end wall of one of the spring casings 12, a socket box 15 is embedded, said box being provided with flanges 15ª that lap upon or are embedded in the inner side of the side board 6, and are thereon secured by screws $d$. The circularly walled socket $e$ in each box 15 is of a depth and diameter that adapt it to loosely receive the opposite end of a corresponding locking bolt 13 when the seat 9 is in position for service.

In order to relieve the ends of the locking bolts 13 from carrying the weight imposed on the seat board 9 when occupied, a bracket hook 16 is secured upon each end of a respective base strip 11, said hooks being bent angularly so as to readily hook over and seat upon the upper edges of the side boards 6 of the wagon body.

It will be noted that by retracting the locking bolts 13 and partly rotating them, the feather keys $c$ will, by their position, be out of line with the grooves they normally occupy, which adjustment of the bolts 13 will hold them retracted and thus permit the seat 9 and its attached springs to be placed in position on the wagon body.

After the seat is mounted on the side boards 6 by an engagement of the bracket hangers or hooks 16 therewith, the handles 13ª are turned around sufficiently to locate the feather keys $c$ opposite respective grooves in the casing end walls; the seat and its attachments may now be moved along on the supper edges of the side boards 6, until the outer ends of the spring pressed locking bolts 13 are disposed opposite the open ends of the socket boxes 15, whereupon said bolts will be forced into the sockets $e$ and the spring supported seat be detachably secured on the wagon body.

Obviously, by a retraction of the bolts 13 and their retention in retracted condition, as hereinbefore explained, the seat is adapted for removal and subsequent replacement, as may be desired.

Having thus described my invention, I claim as new and desire to secure by Letters Patent:

1. The combination with a wagon body having sockets in the inner face of its sides, of a spring seat having a base strip provided with means for engaging the sides of the body for supporting the seat, casings carried by the strips and provided with openings in their end walls, the openings of the outer walls being provided with grooves, and spring pressed bolts mounted in the casing and projecting at each end from said casings one end of the bolts engaging the sockets of the wagon body, the bolts being provided with handles and with keys fitting the grooves of the said openings.

2. A wagon seat, comprising a seat, an elliptical spring secured to each end of the seat, longitudinal base strips to the upper faces of which the lower sections of the springs are secured, said strips being provided with hooks for engaging the sides of a wagon body, casings secured upon the upper sides of the lower sections of the springs, and spring pressed bolts in the casings and adapted to engage sockets in the sides of a wagon body.

In testimony whereof I have signed my name to this specification, in the presence of two subscribing witnesses.

CHARLES W. RASMUS.

Witnesses:
J. A. CLARK,
J. A. GLANTZ.